United States Patent [19]

Mays

[11] 4,010,568
[45] Mar. 8, 1977

[54] FISHING LURE WITH ATTACHABLE FLOAT MEANS

[76] Inventor: Wilburt W. Mays, 2020 N. 8th St., Philadelphia, Pa. 19122

[22] Filed: Nov. 17, 1975

[21] Appl. No.: 632,798

[52] U.S. Cl. .............................. 43/42.22; 43/44.4
[51] Int. Cl.² ........................................ A01K 85/00
[58] Field of Search ................ 43/44.4, 44.2, 44.6, 43/42.22, 3, 41

[56] References Cited
UNITED STATES PATENTS 3,105,319  10/1963  Whalen ............................ 43/44.4
3,387,402  6/1968  Mays ..................................... 43/41

*Primary Examiner*—Hugh R. Chamblee
*Assistant Examiner*—Daniel J. Leach
*Attorney, Agent, or Firm*—Clarence A. O'Brien; Harvey B. Jacobson

[57] ABSTRACT

A live bait fishing lure having a quickly attachable clamp strap to hold the live lure on the main body portion of the lure, and float means engageable with said lure and with said clamp means for adapting the lure to surface fishing.

9 Claims, 6 Drawing Figures

FISHING LURE WITH ATTACHABLE FLOAT MEANS

BACKGROUND OF THE INVENTION

1. Field of the Invention

This invention relates generally to fishing lures and relates specifically to the type adaptable for use with live bait.

2. Description of the Prior Art

A common problem with fishing lures of the type for use with live baits is that the means for attaching said baits to the lure itself are either difficult to use or else they allow the live bait to slip off the lure. Another problem encountered with such type known prior art lures is that the lure can only be used for one type of fishing. That is, the lures are so heavy when prepared for use that they will not ride or float on the surface of the fishing waters.

One prior art fishing lure for live baits is the applicant's prior U.S. Pat. No. 3,387,402, issued June 11, 1968. The invention disclosed herein is an improvement over this prior patent.

SUMMARY OF THE INVENTION

An object of the present invention is to provide a live bait fishing lure device which has means for quickly and easily clamping the live bait to the lure.

Another object of this invention is to provide a quickly attachable float means at the time of clamping the live bait to the basic body lure so that the entire lure will float on the surface of the water.

A further object of this invention is to provide fishing lure components which are easily and inexpensively manufactured.

One of the big advantages of the live bait fishing lure structure disclosed by this invention is that it simplifies and reduces the expense of making such type lures, thus making such lures more adaptable and within the means of more fishermen. Another important feature is the fact that the lure is also readily usable not only with live baits for under-the-surface fishing but also for on-the-surface fishing. In known prior art devices most fishing lures of this type can only be used for either on-the-surface fishing, or bottom fishing, but are not readily adaptable for both types of fishing.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
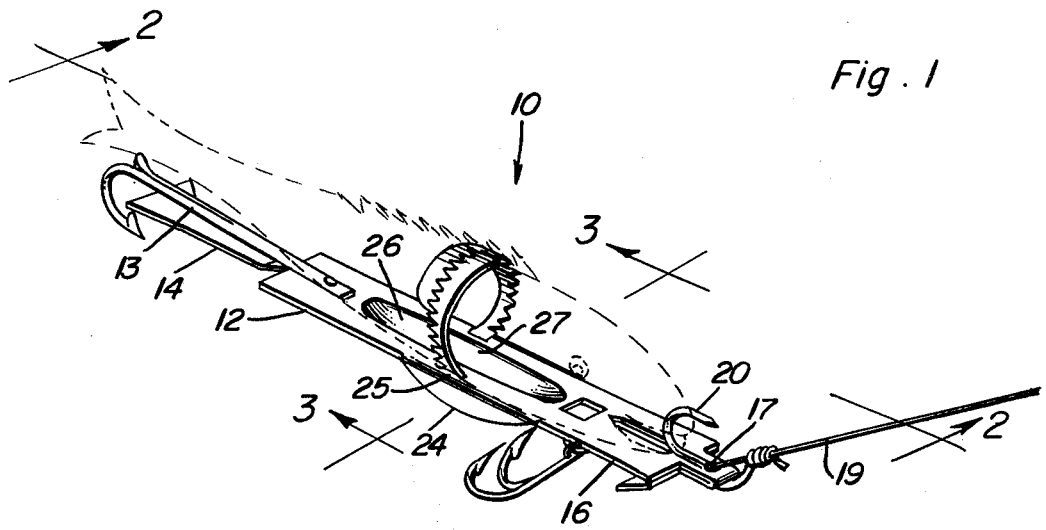
FIG. 1 is a perspective view of one embodiment of the live bait fishing lure of the present invention.

Referring to the drawings in detail, wherein like numerals indicate like elements, there is shown in FIG. 1 a perspective view of the live bait fishing lure of the present invention designed generally by numeral 10.

Figure 2:
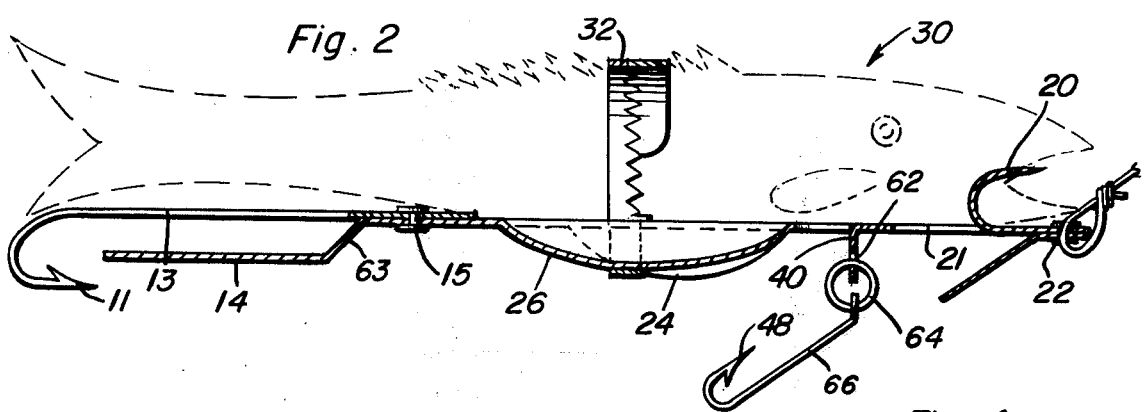
FIG. 2 is a side elevational view, partly in section, taken along line 2—2 of FIG. 1.

The lure 10 has an elongated base 12 formed out of a length of plate which may be formed from any suitable material such as metal and/or plastic. A fishhook 13 projects behind one end 14 of the base 12 and is affixed thereon by rivet 15 as best seen in FIG. 2. The base 12 has a reverse bend or Z-shaped configuration 63 which disposes the end 14 at about the same level with the tips 11 of the hook 13. This portion 14 acts as a hook guard and since the material from which the base is formed is somewhat flexible allows the guard to expose the tips 11 of the hook 13 when a fish bites on the tail of the lure. The opposite end 16 of the base 12 has an eye 17 therethrough providing means for attachment to a leader or fish line 19, in a manner common to the fishing lure art. The base 12 also includes a longitudinal slot 21 therethrough at the front end 16 of the lure.

An impaling spike 20 is provided at the front of the lure to impale and hold the live bait thereon. This impaling spike 20 may be a separate portion attached to the eye 17 by means of eyelet 22, as best seen in FIG. 2, or it may be formed from the base plate itself by stamping when the slot 21 is formed. This latter version is best seen in FIG. 5.

An additional hook is provided at the front of the lure and consists of the flange 40 which may be stamped from the base plate 12, a hole 62 in the center of said flange, and a ring 64 for attaching the hook 66 with tips 48 therefrom. Also stamped from the base plate 12 are side flanges 24 and a center bottom trough 26. The trough 26 and the side flanges 24 operate in conjunction with the hook 46 with tips 48 thereon as a fishhook guard. As can best be visualized in FIGS. 2 and 3, when the lure is being pulled through the water the hook 46 will tend to flatten backwards against the base plate 12 and the tips 48 will then fit into the space between the trough 26 and the side flanges 24. This will offer protection against the lure snagging underwater plants, and other debris.

Figures 4, 5:
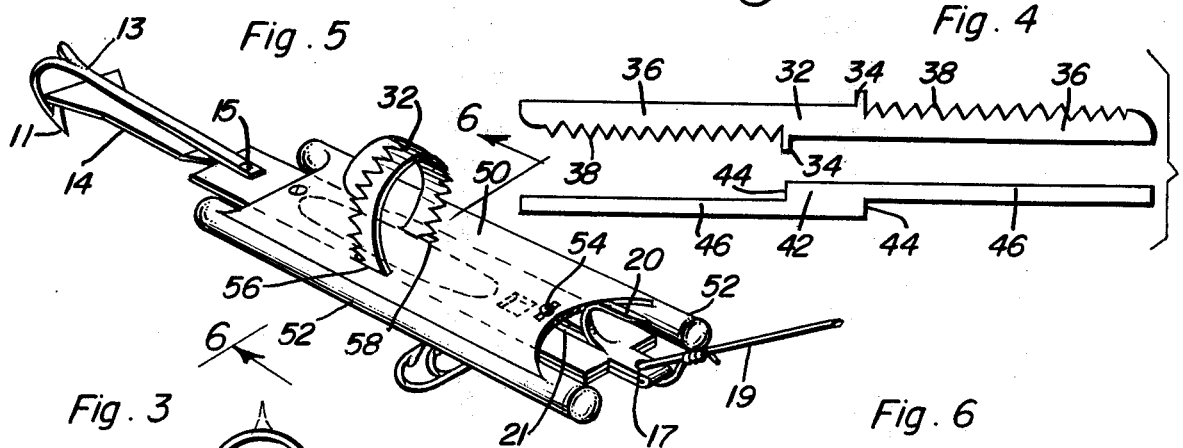
FIG. 4 is a plan view of fastening straps used with this lure.
FIG. 5 is a perspective view of another embodiment of this invention.

Another important feature of this invention is provided in the easy-to-fasten clamp means shown in FIG. 4. There are two versions of the clamp fastener shown. The first version is the one shown in use in the other figures of the drawing and consists of a body portion 32 having ends 36 extending therefrom. Projections 34 are also provided to limit the extent of insertion of the fastening means into the base plate 12 as will be described shortly and sawtooth teeth 38 provide locking projections on said portions 36. As can be seen in FIG. 1 slots 25 and 27 are provided in the base plate 12 for reception of the legs of the fastening means. These slots are not directly aligned across the body of the base plate 12. That is, slot 25 is closer to the front of the lure than is slot 27. This offset serves an important purpose in that the legs 36—36 of the fastening member will be more firmly locked in the slots when the fastening means is holding a live bait on the lure than if the slots were directly aligned with each other.

In operation, the live bait is first impaled upon the spike 20 and then the rest of the bait aligned with the body base 12. Then one of the fastening means of FIG.

Figure 3:
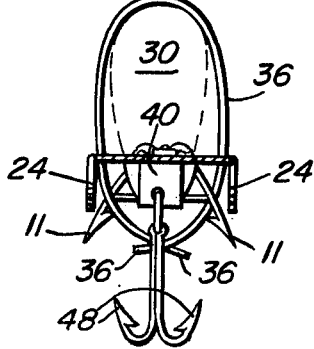
FIG. 3 is a front sectional view taken generally along line 3—3 of FIG. 1.

4 is used to hold the main lure and live bait firmly together. As seen in FIG. 3 the ends of the legs 36 come through the slots and around and underneath the trough 26.

The other embodiment of the fastening means consists of a body portion 42 having legs 46 slightly offset by means of the recesses 44 from each other. This offset corresponds with the offset of the slots 25 and 27 in the base plate 12. Again this offset allows for a more secure fastening of the live bait to the lure body.

Figure 6:
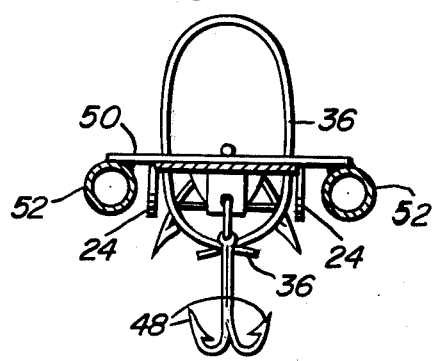
FIG. 6 is a front sectional view taken generally along line 6—6 of FIG. 5.

Another embodiment of this invention includes a float member device as shown in FIGS. 5 and 6. This float member device is just slightly larger in size than the base plate 12 of the lure itself. This float comprises a body portion 50 with pontoons 52 at each side of said body portion. These pontoons are approximately the same length as base plate 12. The body portion 50 is also provided with small slots 56 and 58 slightly offset from each other in the same manner as are the slots 25 and 27 of the base plate 12. An additional fastener may be provided, if so desired, at point 54 at the front of the body 50 for fastening the float through slot 21 in a permanent manner. However, in many applications of this lure it will be more advantageous to let the fisherman use the float when he so desires by having it as a separate component of the lure, and not rigidly or permanently fastened thereto. In such use the float will be placed on plate 12 just before the live bait is impaled on the spike 20 and aligned with the lure longitudinally. Then when the fastening means 32 and 42 is applied to hold the live bait to the lure the ends of the fastening means will pass through the slots 56 and 58 of the float before going through the corresponding slots 25 and 27 in the base plate. Obviously, the fastening means will then hold the live bait, the float device and the base lure together. The fisherman can then use the device for surface fishing as is so often desired.

The fastening means for either modification may be made of metal similar to that of base plate 12, or plastic, or other similar material. The main requirement is that the material be waterproof, strong and tough, and yet resilient and flexible.

The advantages of this new and improved live bait fishing lure are many. A few of the advantages are its simplicity, ease of manufacture, low in cost, flexibility in use, and effectiveness in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A live bait fishing lure having an elongated base formed of a length of plate with a fishhook at one end and having line attachment means at the opposite end, a spike projecting from said base closely adjacent to the line attachment point, said spike being adapted for impaling and securing a live bait thereon, said length of plate having fishhook guard means formed therewith, and fastening means in addition to the impaling means for fastening the body of the live bait to the main body of the lure, the fastening means for the body of the live bait includes a flexible fastening strap having leg portions which pass around the live bait and fasten same to the body portion of the lure, and the leg portions are ofset from each other.

2. The device of claim 1 wherein the offset leg portions of the fastener pass through corresponding offset slots in the base plate for securely holding the ends of the fastening device.

3. The device of claim 2 wherein the offset leg portions of the fastener have serrated teeth along an edge thereof.

4. A live bait fishing lure having an elongated base formed of a length of plate with a fishhook at one end and having line attachment means at the opposite end, a spike projecting from said base closely adjacent to the line attachment point, said spike being adapted for impaling and securing a live bait thereon, said length of plate having fishhook guard means formed therewith, and fastening means in adition to the impaling means for fastening the body of the live bait to the main body of the lure, the fastening means for the body of the live bait includes a flexible fastening strap having leg portions which pass around the live bait and fasten same to the body portion of the lure, together with additional fishing hooks at the front of the lure just behind the impaling spike and the hook guard means on the body portion of the lure include a central depressed trough together with side flanges for receiving and guarding the hook tines when the lure is in use.

5. A live bait fishing lure having a main body portion with hooks attached thereto, an additional body member having pontoons thereon, and fastening means for holding a live bait to the main body portion with the float means therebetween.

6. The device as claimed in claim 5 wherein the main body portion is a flat plate which is long and rectangular, the second float body is correspondingly long and substantially rectangular with the pontoon portions extending approximately the length of the main body of the lure, corresponding fastening slots are provided in the main body portion and in the float body member for receiving the fastening means.

7. The device of claim 6 together with fastening means which comprise a flexible strip having offset fastening legs which fit in the slots of the lure and the float body and said slots are correspondingly offset.

8. The device of claim 7 together with hook means at the front of the lure and hook guard means formed in the main body member for protection of said hook means from snagging when the lure is in use.

9. The device of claim 8 wherein the hook guard means comprise a depressed trough in the center of the main body lure and two depending flanges adjacent thereto for forming hook point receiving valleys therebetween.

* * * * *